United States Patent
Fujino et al.

(12) 
(10) Patent No.: US 6,502,946 B1
(45) Date of Patent: Jan. 7, 2003

(54) PLANAR DISPLAY LAMP AND METHOD OF FORMING A LIGHT SCATTERER PATTERN

(75) Inventors: Kouzou Fujino, Osaka (JP); Makoto Ikeda, Osaka (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/787,475

(22) PCT Filed: Jul. 17, 2000

(86) PCT No.: PCT/JP00/04784

§ 371 (c)(1),
(2), (4) Date: Mar. 19, 2001

(87) PCT Pub. No.: WO01/06175

PCT Pub. Date: Jan. 25, 2001

(30) Foreign Application Priority Data

Jul. 21, 1999 (JP) .......................... 11-205710
Dec. 16, 1999 (JP) .......................... 11-357061

(51) Int. Cl.[7] .............................................. F21V 7/04
(52) U.S. Cl. .................... 362/31; 362/558; 362/330; 362/311
(58) Field of Search .................... 362/558, 559, 362/560, 236, 246, 330, 310, 311, 31

(56) References Cited

U.S. PATENT DOCUMENTS

| | | | | |
|---|---|---|---|---|
| 3,586,851 A | * | 6/1971 | Rudolph ...................... | 240/47 |
| 4,985,809 A | * | 1/1991 | Matsui et al. ................. | 362/31 |
| 5,057,974 A | * | 10/1991 | Mizobe ........................ | 362/26 |
| 5,134,549 A | * | 7/1992 | Yakoyama ................... | 362/31 |
| 5,363,294 A | * | 11/1994 | Yamamoto et al. .......... | 362/330 |
| 5,394,308 A | * | 2/1995 | Watanabe et al. ............. | 362/31 |
| 5,667,289 A | * | 9/1997 | Akahane et al. .............. | 362/31 |
| 5,718,497 A | * | 2/1998 | Yokoyama et al. ........... | 362/31 |
| 5,816,677 A | * | 10/1998 | Kurematsu et al. ........... | 362/31 |
| 5,857,761 A | * | 1/1999 | Abe et al. .................... | 362/551 |
| 5,926,033 A | * | 7/1999 | Saigo et al. .................. | 362/31 |
| 5,931,555 A | * | 8/1999 | Akahane et al. .............. | 362/31 |
| 6,196,691 B1 | * | 3/2001 | Ochiai ......................... | 362/31 |

FOREIGN PATENT DOCUMENTS

| | | |
|---|---|---|
| JP | 08-136919 | 5/1996 |
| JP | 09-160032 | 6/1997 |
| JP | 10-172319 | 6/1998 |
| JP | 11-174445 | 7/1999 |

OTHER PUBLICATIONS

PCT International Search Report, Aug. 15, 2000.

* cited by examiner

*Primary Examiner*—Alan Cariaso
*Assistant Examiner*—Sharon Payne
(74) *Attorney, Agent, or Firm*—RatnerPrestia

(57) ABSTRACT

A plane display lamp using one or two dot-like light sources. This plane display lamp comprises a plate-like light guiding member; a bottom plate covering a bottom surface of said light guiding member; a casing frame covering side faces of said light guiding member; a diffusing sheet covering a top surface of said light guiding member; and dot-like light sources provided on one side face or on two side faces opposite to each other of said light guiding member and emitting light to said light guiding member, and a light scatterer pattern is provided on a bottom surface of the light guiding member. When a side face thereof is inclined, a light scatterer pattern may be provided also on the inclined side face or just below the inclined side face.

13 Claims, 13 Drawing Sheets

LUMINANCE DISTRIBUTION

| | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 98.76 | 105.53 | 113.3 | 114.07 | 114.85 | 115.17 | 115.5 | 119.05 | 122.83 | 125.22 | 127.7 | 130.34 | 133.1 |
| 1 | 114.29 | 118.12 | 122.22 | 122.5 | 122.78 | 123.35 | 123.93 | 126.43 | 129.03 | 132.23 | 135.6 | 138.3 | 141.12 |
| 2 | 135.62 | 134.12 | 132.66 | 132.27 | 131.89 | 132.78 | 133.69 | 134.78 | 135.89 | 140.08 | 144.54 | 147.3 | 150.16 |
| 3 | 138.15 | 135.38 | 132.72 | 133.58 | 134.44 | 135.01 | 135.58 | 138.58 | 141.71 | 146.23 | 151.04 | 154.6 | 158.34 |
| 4 | 140.78 | 136.66 | 132.78 | 134.91 | 137.1 | 137.31 | 137.52 | 142.6 | 148.06 | 152.94 | 158.15 | 162.68 | 167.47 |
| 5 | 151.44 | 143.66 | 136.64 | 139.53 | 142.54 | 145.24 | 148.04 | 153.74 | 159.88 | 164.15 | 168.65 | 172.94 | 177.46 |
| 6 | 163.84 | 151.41 | 140.74 | 144.48 | 148.43 | 154.14 | 160.31 | 166.76 | 173.76 | 177.13 | 180.64 | 184.59 | 188.71 |
| 7 | 167.53 | 159.78 | 152.72 | 160.65 | 169.45 | 177.08 | 185.42 | 188.58 | 191.85 | 193.91 | 196.02 | 197.13 | 198.26 |
| 8 | 171.4 | 169.13 | 166.92 | 180.89 | 197.41 | 208.03 | 219.86 | 216.96 | 214.14 | 214.2 | 214.26 | 211.51 | 208.82 |
| 9 | 185.59 | 188.87 | 192.27 | 214.53 | 242.63 | 248.54 | 254.74 | 243.64 | 233.47 | 230.47 | 227.54 | 220.88 | 214.6 |
| 10 | 202.35 | 213.83 | 226.7 | 263.56 | 314.72 | 308.63 | 302.78 | 277.8 | 256.63 | 249.41 | 242.58 | 231.12 | 220.7 |
| 11 | 211.58 | 238.71 | 273.8 | 312.77 | 364.66 | 343.1 | 323.94 | 294.09 | 269.27 | 256.21 | 244.37 | 233.56 | 223.67 |
| 12 | 221.7 | 270.12 | 345.61 | 384.58 | 433.45 | 386.23 | 348.29 | 312.4 | 283.22 | 263.4 | 246.18 | 236.06 | 226.73 |

FIG. 3A

LUMINANCE DISTRIBUTION

| | 13 | 14 | 15 | 16 | 17 | 18 | 19 | 20 | 21 | 22 | 23 | 24 | 25 |
|---|---|---|---|---|---|---|---|---|---|---|---|---|---|
| 0 | 135.47 | 137.92 | 140.35 | 142.87 | 144.66 | 146.49 | 147.98 | 149.51 | 149.82 | 150.13 | 148.8 | 147.5 | 143.97 |
| 1 | 144.78 | 148.65 | 152.29 | 156.11 | 158.37 | 160.69 | 161.88 | 163.09 | 162.56 | 162.03 | 160.66 | 159.32 | 156.89 |
| 2 | 155.47 | 161.18 | 166.44 | 172.05 | 174.95 | 177.95 | 178.66 | 179.38 | 177.66 | 175.98 | 174.58 | 173.2 | 172.36 |
| 3 | 162.57 | 167.04 | 169.57 | 172.17 | 173.56 | 174.98 | 175.59 | 176.2 | 174.94 | 173.69 | 172.63 | 171.59 | 169.11 |
| 4 | 170.35 | 173.34 | 172.81 | 172.29 | 172.2 | 172.11 | 172.62 | 173.14 | 172.3 | 171.46 | 170.73 | 170.01 | 165.98 |
| 5 | 179.01 | 180.6 | 178.18 | 175.84 | 174.58 | 173.35 | 172.84 | 172.34 | 170.89 | 169.46 | 168.85 | 168.24 | 164.87 |
| 6 | 188.6 | 188.49 | 183.9 | 179.53 | 177.04 | 174.61 | 173.06 | 171.54 | 169.5 | 167.51 | 167.01 | 166.51 | 163.78 |
| 7 | 194.48 | 190.85 | 186.31 | 181.99 | 178.09 | 174.36 | 172.19 | 170.07 | 167.89 | 165.77 | 165.49 | 165.22 | 161.11 |
| 8 | 200.74 | 193.26 | 188.78 | 184.51 | 179.16 | 174.12 | 171.33 | 168.62 | 166.31 | 164.06 | 164 | 163.94 | 158.52 |
| 9 | 205.76 | 197.62 | 191.66 | 186.04 | 178.86 | 172.22 | 169.11 | 166.1 | 164.07 | 162.1 | 161.68 | 161.27 | 155.65 |
| 10 | 211.04 | 202.19 | 194.62 | 187.59 | 178.57 | 170.37 | 166.94 | 163.65 | 161.9 | 160.18 | 159.43 | 158.68 | 152.88 |
| 11 | 212.21 | 201.87 | 193.31 | 185.45 | 178.15 | 171.4 | 166.95 | 162.72 | 160.85 | 159.02 | 157.4 | 155.81 | 150.78 |
| 12 | 213.4 | 201.55 | 192.02 | 183.35 | 177.73 | 172.44 | 166.96 | 161.81 | 159.82 | 157.87 | 155.42 | 153.04 | 148.73 |

FIG. 3B

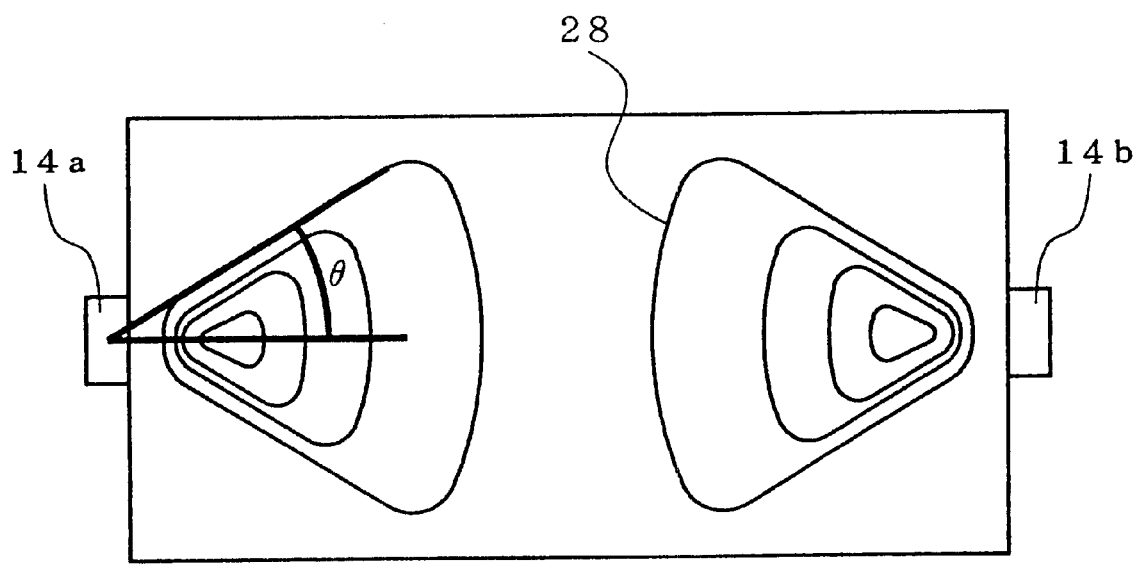
F I G. 4

|    | 0     | 1     | 2     | 3     | 4     | 5     | 6     | 7     | 8     | 9     | 10    | 11    | 12    |
|----|-------|-------|-------|-------|-------|-------|-------|-------|-------|-------|-------|-------|-------|
| 0  | 1.000 | 0.936 | 0.872 | 0.866 | 0.860 | 0.857 | 0.855 | 0.830 | 0.804 | 0.789 | 0.773 | 0.758 | 0.742 |
| 1  | 0.864 | 0.836 | 0.808 | 0.806 | 0.804 | 0.801 | 0.797 | 0.781 | 0.765 | 0.747 | 0.728 | 0.714 | 0.700 |
| 2  | 0.728 | 0.736 | 0.744 | 0.747 | 0.749 | 0.744 | 0.739 | 0.733 | 0.727 | 0.705 | 0.683 | 0.670 | 0.658 |
| 3  | 0.715 | 0.729 | 0.744 | 0.739 | 0.735 | 0.732 | 0.728 | 0.713 | 0.697 | 0.675 | 0.654 | 0.639 | 0.624 |
| 4  | 0.702 | 0.723 | 0.744 | 0.732 | 0.720 | 0.719 | 0.718 | 0.693 | 0.667 | 0.646 | 0.624 | 0.607 | 0.590 |
| 5  | 0.652 | 0.687 | 0.723 | 0.708 | 0.693 | 0.680 | 0.667 | 0.642 | 0.618 | 0.602 | 0.586 | 0.571 | 0.557 |
| 6  | 0.603 | 0.652 | 0.702 | 0.684 | 0.665 | 0.641 | 0.616 | 0.592 | 0.568 | 0.558 | 0.547 | 0.535 | 0.523 |
| 7  | 0.589 | 0.618 | 0.647 | 0.615 | 0.583 | 0.558 | 0.533 | 0.524 | 0.515 | 0.509 | 0.504 | 0.501 | 0.498 |
| 8  | 0.576 | 0.584 | 0.592 | 0.546 | 0.500 | 0.475 | 0.449 | 0.455 | 0.461 | 0.461 | 0.461 | 0.467 | 0.473 |
| 9  | 0.532 | 0.523 | 0.514 | 0.460 | 0.407 | 0.397 | 0.388 | 0.405 | 0.423 | 0.429 | 0.434 | 0.447 | 0.460 |
| 10 | 0.488 | 0.462 | 0.436 | 0.375 | 0.314 | 0.320 | 0.326 | 0.356 | 0.385 | 0.396 | 0.407 | 0.427 | 0.447 |
| 11 | 0.467 | 0.414 | 0.361 | 0.316 | 0.271 | 0.288 | 0.305 | 0.336 | 0.367 | 0.385 | 0.404 | 0.423 | 0.442 |
| 12 | 0.445 | 0.366 | 0.286 | 0.257 | 0.228 | 0.256 | 0.284 | 0.316 | 0.349 | 0.375 | 0.401 | 0.418 | 0.436 |

FIG.5A

|    | 13    | 14    | 15    | 16    | 17    | 18    | 19    | 20    | 21    | 22    | 23    | 24    | 25    |
|----|-------|-------|-------|-------|-------|-------|-------|-------|-------|-------|-------|-------|-------|
| 0  | 0.729 | 0.716 | 0.704 | 0.691 | 0.683 | 0.674 | 0.667 | 0.661 | 0.659 | 0.658 | 0.664 | 0.670 | 0.686 |
| 1  | 0.682 | 0.664 | 0.649 | 0.633 | 0.624 | 0.615 | 0.610 | 0.606 | 0.608 | 0.610 | 0.615 | 0.620 | 0.630 |
| 2  | 0.635 | 0.613 | 0.593 | 0.574 | 0.565 | 0.555 | 0.553 | 0.551 | 0.556 | 0.561 | 0.566 | 0.570 | 0.573 |
| 3  | 0.607 | 0.591 | 0.582 | 0.574 | 0.569 | 0.564 | 0.562 | 0.560 | 0.565 | 0.569 | 0.572 | 0.576 | 0.584 |
| 4  | 0.580 | 0.570 | 0.571 | 0.573 | 0.574 | 0.574 | 0.572 | 0.570 | 0.573 | 0.576 | 0.578 | 0.581 | 0.595 |
| 5  | 0.552 | 0.547 | 0.554 | 0.562 | 0.566 | 0.570 | 0.571 | 0.573 | 0.578 | 0.583 | 0.585 | 0.587 | 0.599 |
| 6  | 0.524 | 0.524 | 0.537 | 0.550 | 0.558 | 0.566 | 0.571 | 0.576 | 0.583 | 0.590 | 0.591 | 0.593 | 0.603 |
| 7  | 0.508 | 0.517 | 0.530 | 0.543 | 0.555 | 0.566 | 0.574 | 0.581 | 0.588 | 0.596 | 0.597 | 0.598 | 0.613 |
| 8  | 0.492 | 0.511 | 0.523 | 0.535 | 0.551 | 0.567 | 0.576 | 0.586 | 0.594 | 0.602 | 0.602 | 0.602 | 0.623 |
| 9  | 0.480 | 0.500 | 0.515 | 0.531 | 0.552 | 0.573 | 0.584 | 0.595 | 0.602 | 0.609 | 0.611 | 0.612 | 0.635 |
| 10 | 0.468 | 0.488 | 0.507 | 0.526 | 0.553 | 0.580 | 0.592 | 0.603 | 0.610 | 0.617 | 0.619 | 0.622 | 0.646 |
| 11 | 0.465 | 0.489 | 0.511 | 0.533 | 0.554 | 0.576 | 0.592 | 0.607 | 0.614 | 0.621 | 0.627 | 0.634 | 0.655 |
| 12 | 0.463 | 0.490 | 0.514 | 0.539 | 0.556 | 0.573 | 0.592 | 0.610 | 0.618 | 0.626 | 0.635 | 0.645 | 0.664 |

FIG.5B

|  | 0 | 1 | 2 | 3 | 4 | 5 | 6 | 7 | 8 | 9 | 10 | 11 | 12 |
|---|---|---|---|---|---|---|---|---|---|---|---|---|---|
| 0 | 1.1 | 1.1 | 1.1 | 1.0 | 1.0 | 1.0 | 1.0 | 1.0 | 1.0 | 1.0 | 1.0 | 1.0 | 1.0 |
| 1 | 1.0 | 1.0 | 1.0 | 1.0 | 1.0 | 1.0 | 1.0 | 1.0 | 1.0 | 1.0 | 1.0 | 1.0 | 0.9 |
| 2 | 1.0 | 1.0 | 1.0 | 1.0 | 1.0 | 1.0 | 1.0 | 1.0 | 1.0 | 0.9 | 0.9 | 0.9 | 0.9 |
| 3 | 1.0 | 1.0 | 1.0 | 1.0 | 1.0 | 1.0 | 1.0 | 1.0 | 0.9 | 0.9 | 0.9 | 0.9 | 0.9 |
| 4 | 0.9 | 1.0 | 1.0 | 1.0 | 1.0 | 1.0 | 1.0 | 0.9 | 0.9 | 0.9 | 0.9 | 0.9 | 0.9 |
| 5 | 0.9 | 0.9 | 1.0 | 0.9 | 0.9 | 0.9 | 0.9 | 0.9 | 0.9 | 0.9 | 0.9 | 0.9 | 0.8 |
| 6 | 0.9 | 0.9 | 0.9 | 0.9 | 0.9 | 0.9 | 0.9 | 0.9 | 0.9 | 0.8 | 0.8 | 0.8 | 0.8 |
| 7 | 0.9 | 0.9 | 0.9 | 0.9 | 0.9 | 0.8 | 0.8 | 0.8 | 0.8 | 0.8 | 0.8 | 0.8 | 0.8 |
| 8 | 0.9 | 0.9 | 0.9 | 0.8 | 0.8 | 0.8 | 0.8 | 0.8 | 0.8 | 0.8 | 0.8 | 0.8 | 0.8 |
| 9 | 0.8 | 0.8 | 0.8 | 0.8 | 0.7 | 0.7 | 0.7 | 0.7 | 0.7 | 0.7 | 0.7 | 0.8 | 0.8 |
| 10 | 0.8 | 0.8 | 0.7 | 0.7 | 0.6 | 0.6 | 0.6 | 0.7 | 0.7 | 0.7 | 0.7 | 0.7 | 0.8 |
| 11 | 0.8 | 0.7 | 0.7 | 0.6 | 0.6 | 0.6 | 0.6 | 0.7 | 0.7 | 0.7 | 0.7 | 0.7 | 0.7 |
| 12 | 0.8 | 0.7 | 0.6 | 0.6 | 0.5 | 0.6 | 0.6 | 0.6 | 0.7 | 0.7 | 0.7 | 0.7 | 0.7 |

FIG. 6A

|  | 13 | 14 | 15 | 16 | 17 | 18 | 19 | 20 | 21 | 22 | 23 | 24 | 25 |
|---|---|---|---|---|---|---|---|---|---|---|---|---|---|
| 0 | 1.0 | 1.0 | 0.9 | 0.9 | 0.9 | 0.9 | 0.9 | 0.9 | 0.9 | 0.9 | 0.9 | 0.9 | 0.9 |
| 1 | 0.9 | 0.9 | 0.9 | 0.9 | 0.9 | 0.9 | 0.9 | 0.9 | 0.9 | 0.9 | 0.9 | 0.9 | 0.9 |
| 2 | 0.9 | 0.9 | 0.9 | 0.9 | 0.8 | 0.8 | 0.8 | 0.8 | 0.8 | 0.8 | 0.8 | 0.9 | 0.9 |
| 3 | 0.9 | 0.9 | 0.9 | 0.9 | 0.9 | 0.8 | 0.8 | 0.8 | 0.8 | 0.9 | 0.9 | 0.9 | 0.9 |
| 4 | 0.9 | 0.9 | 0.9 | 0.9 | 0.9 | 0.9 | 0.9 | 0.9 | 0.9 | 0.9 | 0.9 | 0.9 | 0.9 |
| 5 | 0.8 | 0.8 | 0.8 | 0.8 | 0.8 | 0.9 | 0.9 | 0.9 | 0.9 | 0.9 | 0.9 | 0.9 | 0.9 |
| 6 | 0.8 | 0.8 | 0.8 | 0.8 | 0.8 | 0.8 | 0.9 | 0.9 | 0.9 | 0.9 | 0.9 | 0.9 | 0.9 |
| 7 | 0.8 | 0.8 | 0.8 | 0.8 | 0.8 | 0.8 | 0.9 | 0.9 | 0.9 | 0.9 | 0.9 | 0.9 | 0.9 |
| 8 | 0.8 | 0.8 | 0.8 | 0.8 | 0.8 | 0.8 | 0.9 | 0.9 | 0.9 | 0.9 | 0.9 | 0.9 | 0.9 |
| 9 | 0.8 | 0.8 | 0.8 | 0.8 | 0.8 | 0.9 | 0.9 | 0.9 | 0.9 | 0.9 | 0.9 | 0.9 | 0.9 |
| 10 | 0.8 | 0.8 | 0.8 | 0.8 | 0.8 | 0.9 | 0.9 | 0.9 | 0.9 | 0.9 | 0.9 | 0.9 | 0.9 |
| 11 | 0.8 | 0.8 | 0.8 | 0.8 | 0.8 | 0.9 | 0.9 | 0.9 | 0.9 | 0.9 | 0.9 | 0.9 | 0.9 |
| 12 | 0.8 | 0.8 | 0.8 | 0.8 | 0.8 | 0.9 | 0.9 | 0.9 | 0.9 | 0.9 | 0.9 | 0.9 | 0.9 |

FIG. 6B

|    | 0     | 2     | 4     | 6     | 8     | 10    | 12    | 14    | 16    | 18    | 20    | 22    | 24    | 25    |
|----|-------|-------|-------|-------|-------|-------|-------|-------|-------|-------|-------|-------|-------|-------|
| 0  | 67.76 | 70.85 | 66.71 | 63.11 | 64.84 | 62.83 | 61.52 | 62.56 | 62.31 | 60.95 | 70.97 | 66.59 | 65.32 | 66.15 |
| 1  | 87.91 | 88.36 | 84.07 | 81.7  | 81.51 | 77.37 | 79.7  | 77.8  | 83    | 85.85 | 92.71 | 99.34 | 102.5 | 103.6 |
| 2  | 117.9 | 97.16 | 96.61 | 92.33 | 87.5  | 85.65 | 86.68 | 85.51 | 85.05 | 91.03 | 98.88 | 97.75 | 102   | 106.6 |
| 4  | 116.6 | 98.81 | 92.48 | 89.76 | 86.07 | 85.45 | 86.24 | 87.47 | 86.08 | 90.63 | 97.12 | 98.29 | 101.2 | 103.1 |
| 6  | 117.7 | 90.89 | 88.98 | 86.49 | 85.54 | 87.57 | 87.19 | 88.93 | 92.02 | 96.9  | 99.23 | 101.9 | 105.1 | 102.2 |
| 8  | 69.28 | 80.52 | 80.33 | 82.46 | 85.36 | 89.24 | 92.31 | 94.75 | 100.3 | 105.9 | 110.6 | 113.6 | 113.1 | 111.8 |
| 10 | 60.84 | 73.21 | 71.6  | 79    | 83.92 | 91.2  | 94.34 | 99.07 | 104.6 | 109.3 | 116.9 | 118.9 | 117.4 | 115.4 |
| 12 | 62.85 | 68.8  | 60    | 67.94 | 82.32 | 92.44 | 93.11 | 100.9 | 105.6 | 113.7 | 114.7 | 115   | 116.7 | 115   |

F I G . 8

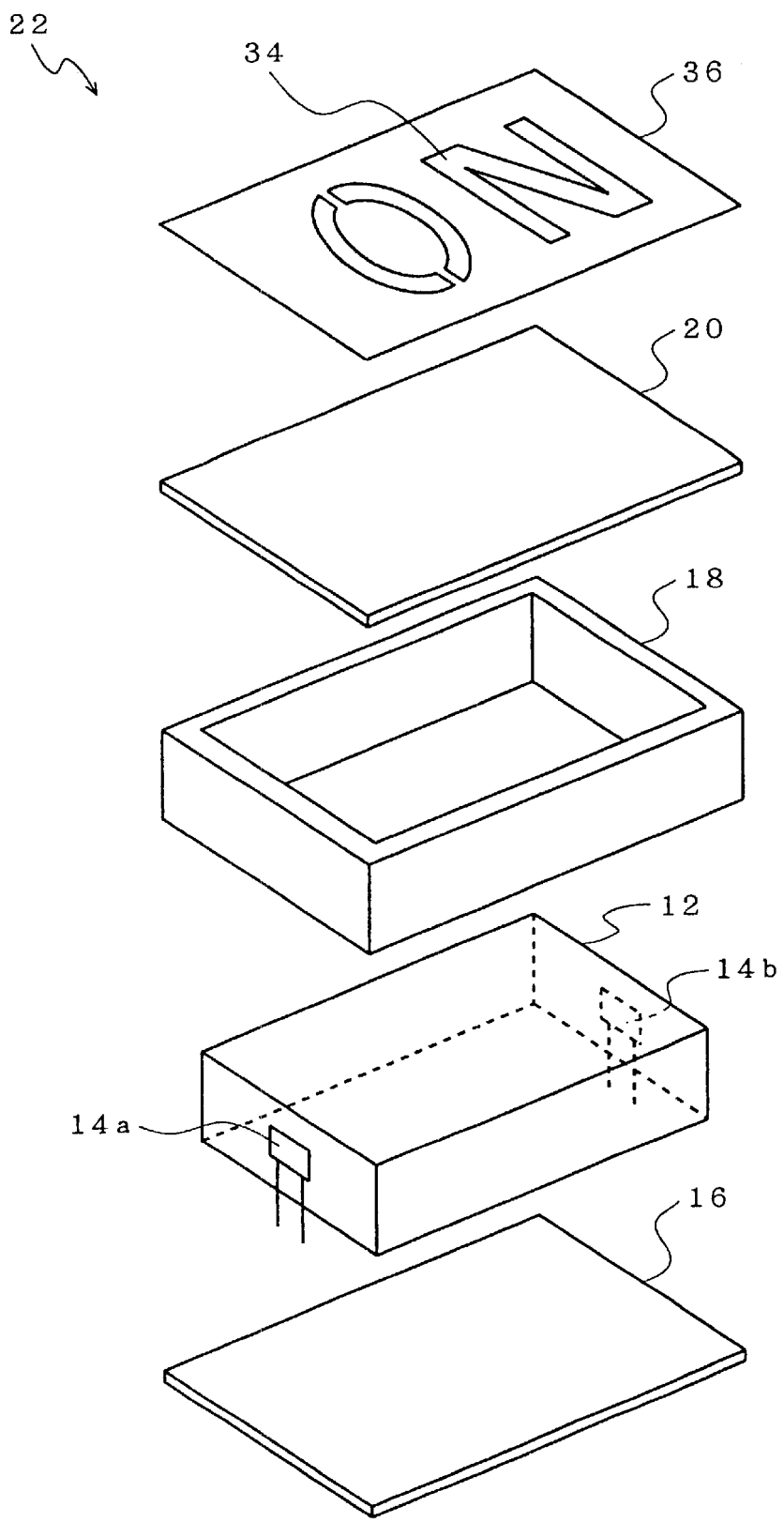
F I G. 9

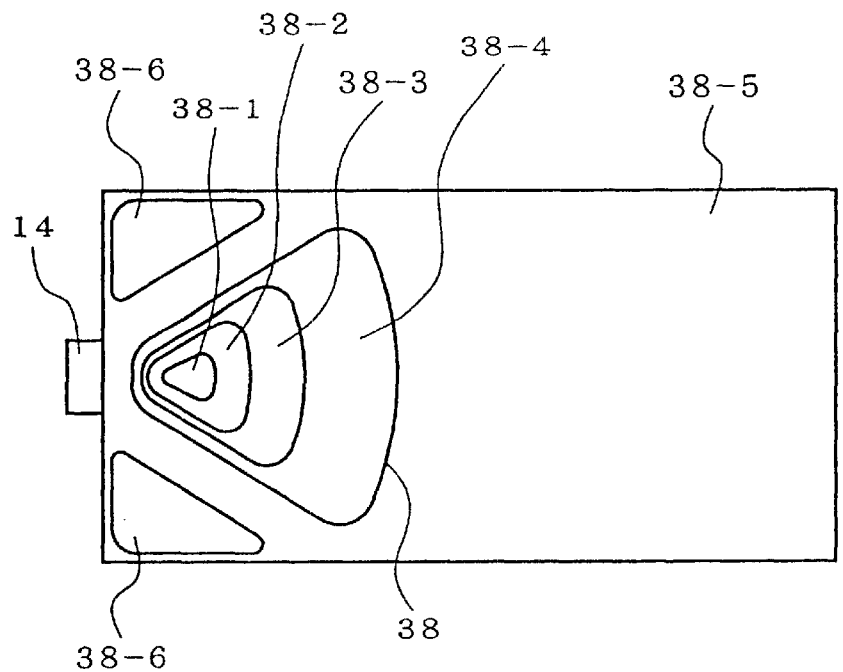
F I G . 10
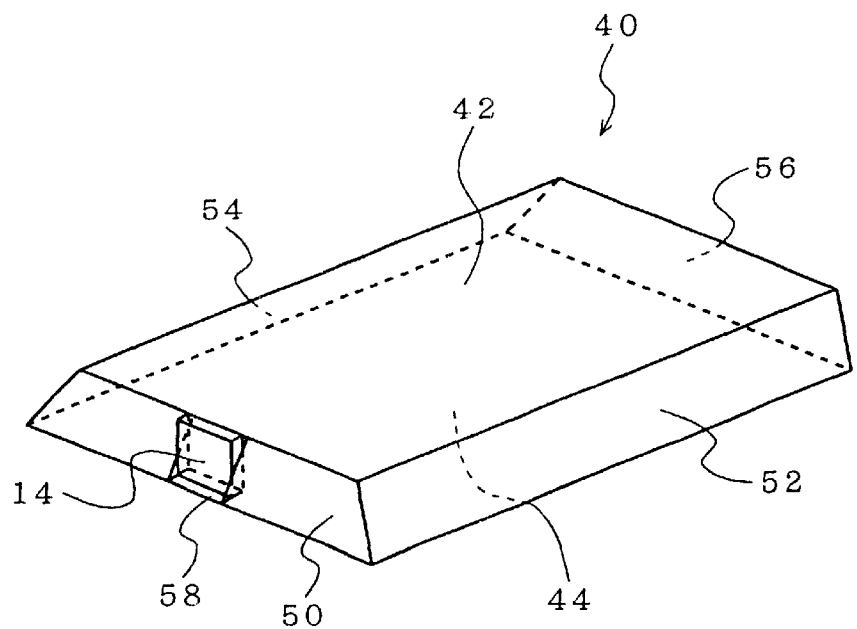
F I G . 11

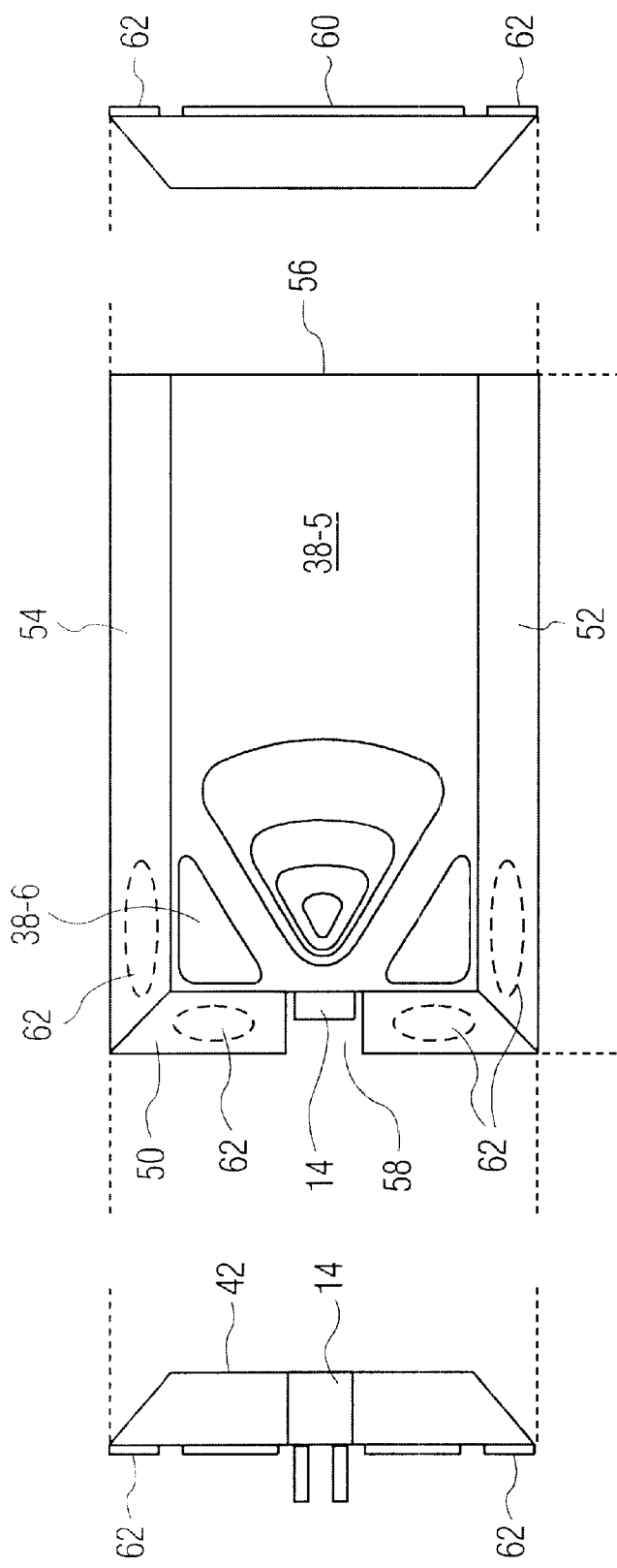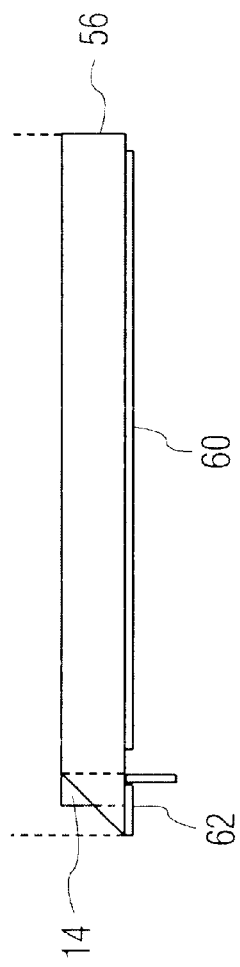
FIG. 12C
FIG. 12B
FIG. 12D
FIG. 12A

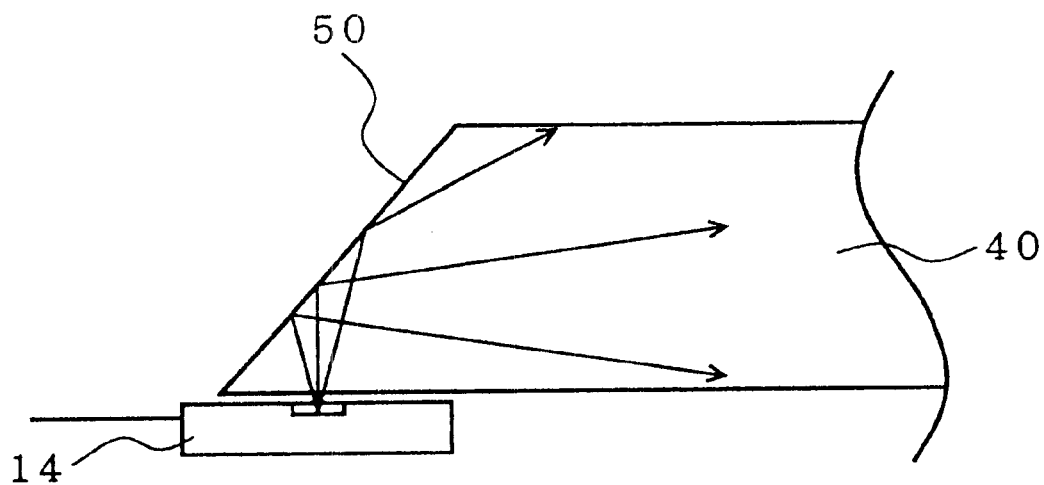
F I G. 1 3
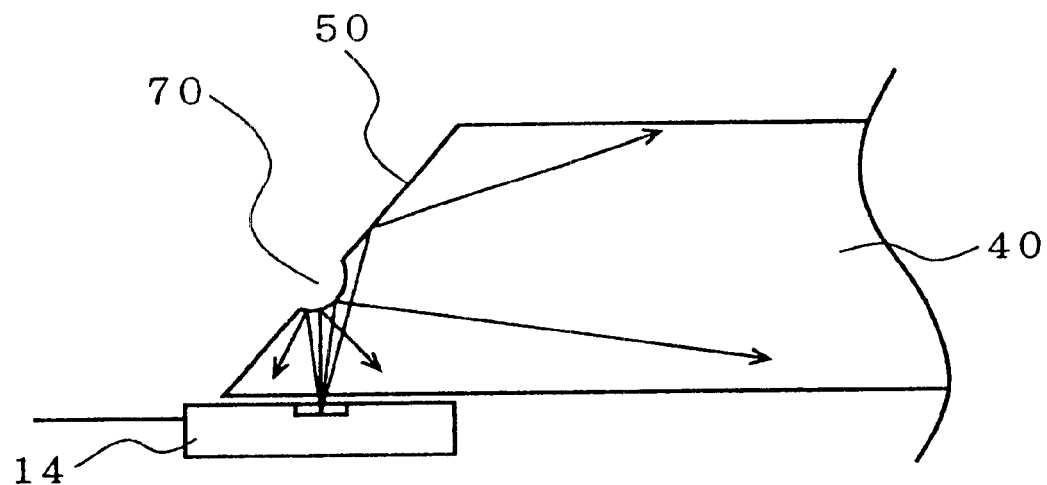
F I G. 1 4

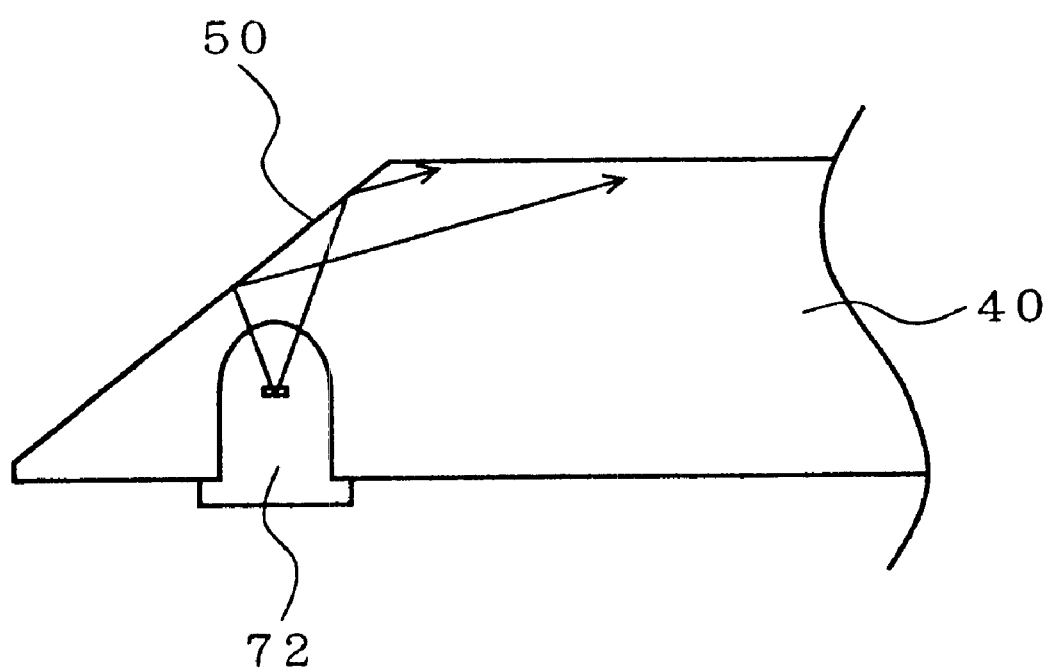
F I G . 1 5

PLANAR DISPLAY LAMP AND METHOD OF FORMING A LIGHT SCATTERER PATTERN

TECHNICAL FIELD

The present invention relates to a planar display lamp. More specifically this invention relates to a planar display lamp based on a light guiding system in which a bottom surface of light guiding member has a light scattering function for homogeneously emitting light to the outside, and further to a method of forming a light scatterer pattern realizing a light scattering function.

BACKGROUND ART

A planar display lamp (with the display area of several tens $cm^2$ or less) is used in various types of devices and equipment used indoors to display a state of or an instruction for an operation of the devices or equipment. One example of the planar display lamp is a pilot lamp in which a light source such as a compact incandescent lamp or a light-emitting diode (LED) is attached to a casing having a colored plastic plate surface. In these types of lamps, when a letter or a sign is to be displayed on a display surface, as the luminance just above the light source is higher than that in the peripheral area of the display surface, non-uniformity in luminance on the display surface is large, and the letter or sign displayed on the surface can not well be visually recognized. Further these types of display lamps allows only discrimination between two stages basically by turning ON or OFF the lamp. Also there is a planar display lamp in which a light source capable of emitting light changing its color is provided under a semitransparent plastic plate, but non-uniformity in luminance varies according to a color of emitted light more remarkably as compared to the case of single color planar display lamp, so that the adaptability to be visually recognized is further lower.

As a means for reducing non-uniformity in luminance, there has been known the method used in a planar illumination device applied as a back light for a liquid crystal display unit. In this method, a plate-like light guiding member is used and a linear light source such as a fluorescent light source or a plurality of dot-like light sources such as LEDs are provided around the plate-like light guiding member thereby implementing a planar light source. Generally a reflection layer with distributed reflectivity is provided on a bottom surface of the light guiding member so that the light sources emit light with substantially homogeneous intensity from a surface of the plate-like light guiding member.

In the pilot lamp with the conventional type of light source such as an incandescent lamp or an LED attached therein as described above, non-uniformity in luminance is large on the light-emitting surface, so that the visibility of displayed contents is low and also the display quality is disadvantageously low.

Further with the plane display lamp having a light source capable of emitting light changing its color to provide light with a desired color, it is impossible to obtain the excellent display quality.

DISCLOSURE OF THE INVENTION

It is an object of the invention to provide a plane display lamp with reduced non-uniformity in luminance by using a plate-like light guiding member.

It is another object of the invention to provide a plane display lamp with reduced power consumption and having a light source which can easily be driven.

It is still another object of the invention to provide a plane display lamp having two dot-like light sources.

It is another object of the present invention to provide a plane display lamp having only one dot-like light source, yet capable of reducing non-uniformity in luminance on a light-emitting surface.

It is another object to provide a method of forming a light scatterer pattern printed on a bottom surface of a plate-like light guiding member.

In a first aspect of the present invention, one dot-like light source is provided at a center of each of the opposite side faces of a rectangular plane light guiding member respectively. To reduce non-uniformity in luminance of light coming out from a surface of this light guiding member, a light scatterer pattern with reflected light intensity two-dimensionally distributed thereon is formed on a bottom surface of the light guiding member.

As the dot-like light source, one LED chip loaded on the same package or a plurality of LED chips, for instance, for three RGB elementary colors loaded adjacent to each other on the same package may be used. In the latter case, as a plurality of LEDs are provided adjacent to each other, when light for each color is emitted, non-uniformity in luminance does not substantially change, so that a plurality of states can be displayed by using lights for different colors.

What is important in the present invention is a light scatterer pattern formed on a rear side of a light-emitting surface of a light guiding member so that light emitted from a dot-like light source is taken by a plate-like light guiding member to give uniform brightness, namely uniform luminance on the light-emitting surface of the light guiding member. By giving a certain level of regularity to a pattern form, it has become possible to provide homogeneous luminance distribution on an entire light-emitting surface of a light guiding member and also to provide planar displays having apparently uniform brightness.

To realize the optimal pattern as described above, how to form a dot pattern of a light scatterer on a bottom surface of the light guiding member is important.

A light scatterer dot pattern formation method according to a second aspect of the present invention comprises the steps of:

a) forming a light scatterer homogeneously all over a bottom surface of a light guiding member for assessment having the same size and made from the same materials as said light guiding member;

b) assembling said plane display lamp;

c) measuring luminance at each coordinate point on a light-emitting surface of said plane display lamp;

d) converting the measured luminance at each coordinate point through inverse-proportional operation to standardized value using the lowest value in a distribution the luminance as a reference;

e) calculating an area of a light scatterer dot at each coordinate point from the standardized value obtained from the conversion in the previous step; and f) forming a pattern of light scatterer dots each area thereof is calculated in the previous step on a bottom surface of a light guiding member different from that for assessment.

A third aspect of the present invention provides a plane display lamp which can reduce non-uniformity in luminance on the light-emitting surface even when only one dot-like light source is used. In the plane display lamp using one dot-like light source according to the present invention, three of the four side faces of the rectangular planar light guiding member are inclined side faces. On a central one of these three included side faces, or on a bottom surface of the light guiding member just below the side face, one dot-like light source is provided. Further provided on a bottom surface of the light guiding member just below the top surface of the light guiding member is a light scatterer dot pattern formed according to the method according to the second aspect of the present invention as described above, and further a light scatterer pattern is provided on a bottom surface of the light guiding member just below an inclined side face adjacent to an area where light from the dot-like light source does not fully reach and the luminance is insufficient.

BRIEF DESCRIPTION OF THE DRAWINGS

FIG. 3A and FIG. 3B are views each showing a table of measured luminance distribution on a plane display lamp in a case where high reflection ink is printed all over a bottom surface of a light guiding member respectively;

FIG. 4 is a view showing the luminance distribution in FIG. 3 with the contour lines;

FIG. 5A and FIG. 5B are views each showing a table of standardized value distribution respectively;

FIG. 6A and FIG. 6B are views each showing a table of calculated circular dot radiuses;

FIG. 8 is a view showing a table of measured luminance distribution on a plane display lamp in a case where a circular dot pattern is printed on a bottom surface of the light guiding member;

FIG. 9 is a exploded perspective view showing another example of the plane display lamp according to the present invention;

FIG. 10 is a view showing with contour lines the luminance distribution when there is provided one dot-like light source on a bottom surface of the light guiding member;

FIG. 11 is a perspective view showing a light guiding member according to the present invention;

FIGS. 12A, 12B, 12C and 12D are views showing a top surface and a side surface of the light guiding member shown in FIG. 11;

FIG. 13 is a view showing an example in which an LED is provided on a bottom surface of a light guiding member;

FIG. 14 is a view showing another example in which an LED is provided on a bottom surface of the light guiding member; and FIG. 15 is a view showing an example in which a dot-like light source is provided inside the light guiding member.

BEST MODE FOR CARRYING OUT THE INVENTION

First Embodiment

Figure 1:
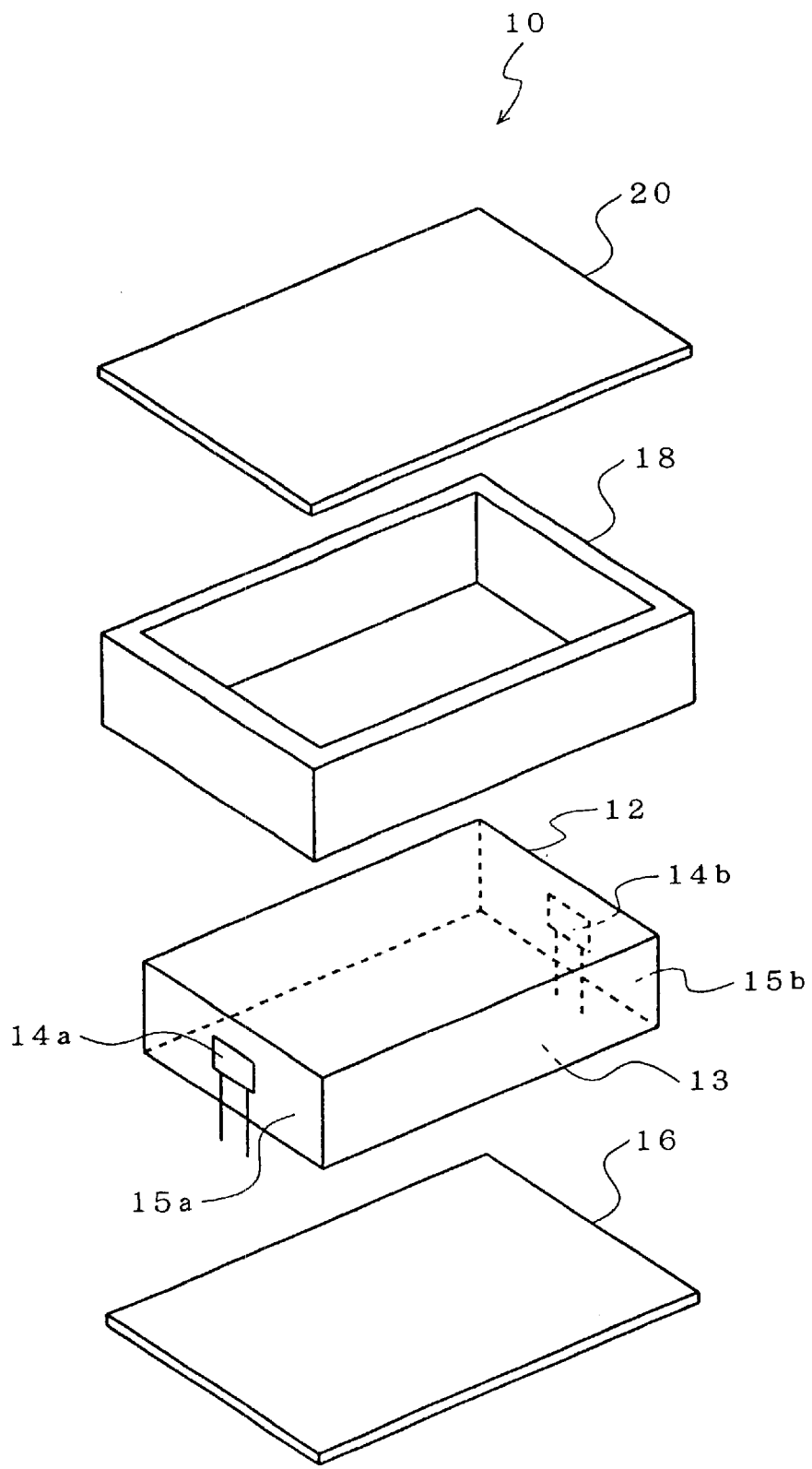
FIG. 1 is a exploded perspective view showing one example of a plane display lamp according to the present invention.

A exploded perspective view of a plane display lamp according to a first embodiment of the present invention is shown in FIG. 1.

This plane display lamp 10 has a light guiding member 12 comprising a rectangular transparent acrylic resin plate with the size of 50 mm×25 mm×5 mm. In this embodiment, each side face of the light guiding member is vertical to the top surface as well as to the bottom surface thereof.

In this light guiding member 12, dot-like light sources 14a, 14b are provided at central positions of side faces in the opposite shorter edge sides respectively. An LED with the output of 1.5 mW for a forward direction current of 20 mA and with the main wavelength of green color light of 530 nm from Nichia Kagaku Kogyo (K.K) is used as the dot-like light source. The size of one LED (semiconductor chip) is 0.3 mm×0.3 mm, and the size of an aperture (light-emitting section) as a light outlet port of the LED package with one chip loaded therein is about 1 mm×2 mm.

This transparent acrylic light guiding member 12 has a white bottom plate 16, four side faces of which are covered with a white casing frame 18. A diffusing sheet 20 is adhered on a top surface of, namely in the light-emitting surface side of the white casing frame 18. White ABS resin is used for the white casing 18 as well as for the white bottom plate 16.

Further a light scatterer having a predetermined pattern was formed with the highly reflective white ink from Teikoku Ink Seizou (K.K) on a bottom surface 13 of the light guiding member 12. The pattern of the light scatterer is generally a circular dot.

Although a color of the casing 18 and bottom plate 16 is typically white, other colors such as silver may be used. In the case of single color light source, any appropriate color may be selected according to the wavelength of the light.

A specific sequence of designing a printed pattern is described in detail below. At first the light guiding member 12 with the highly reflective white ink printed on the entire bottom surface thereof is prepared, this light guiding member 12 is placed in the white casing 18 and covered with the white bottom plate 16 with a diffusing sheet adhered on a light-emitting surface of the white casing, and then a plane display lamp for designing a light scatterer pattern is assembled. Then the luminance distributed on the light-emitting surface when the 20 mA current is flown through each LED is measured.

Figure 2:
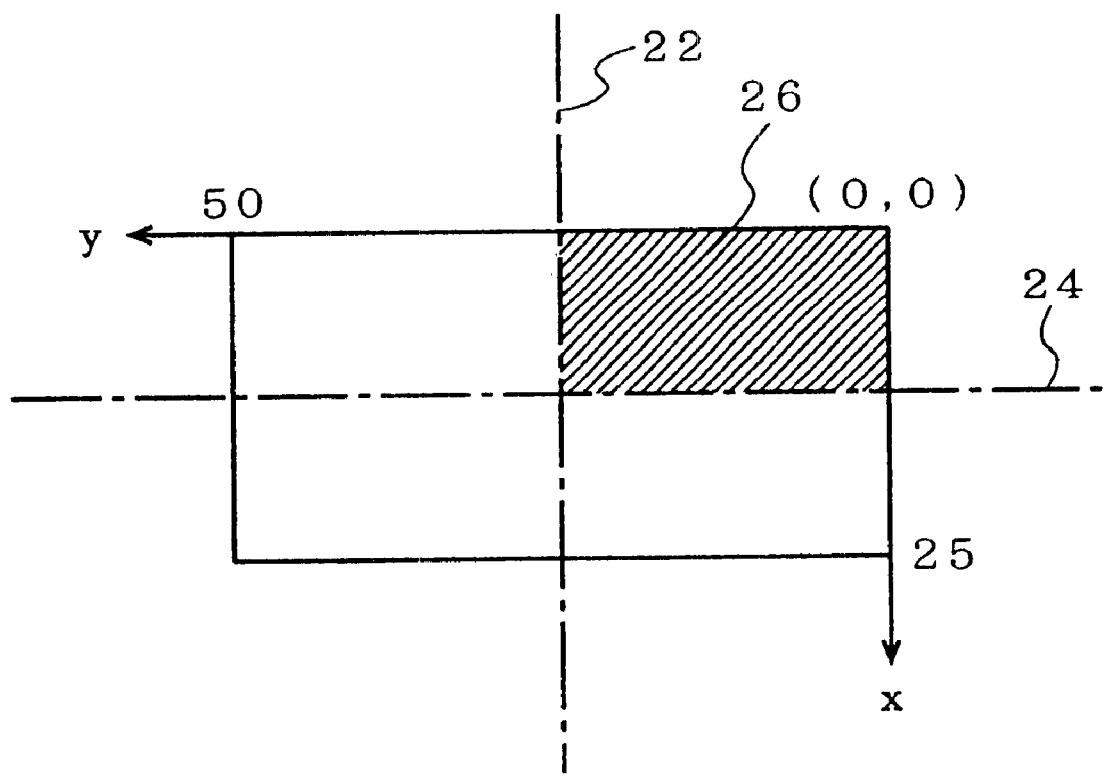
FIG. 2 is a view showing a light-emitting surface with a X-Y coordinate system divided to four fields.

As the LEDs 14a, 14b are provided at central positions of the side faces 15a, 15b in the side of opposite shorter edges of the light guiding member 12 respectively as described above, when the light-emitting surface is divided with two lines perpendicular to each other into four equal regions, the luminance distribution on each region is identical, so that it is necessary only to measure the luminance distribution on one of the four regions. FIG. 2 shows a state where the light-emitting surface is shown with an X-Y coordinate system. The coordinate plane is plotted with a corner of the light-emitting surface as the origin and the X-axis was divided to 25 equal zones and also the Y-axis to 50 equal zones. This figure shows the state where the light-emitting surface was divided with the two lines 22, 24 crossing each other at right angles at a center of the light-emitting surface to four regions. The luminance distribution is measured on the quadrant region 26 shadowed with inclined lines.

When the luminance distribution on the region 26 is measured, the luminance distribution on the entire light-emitting surface can be obtained by applying the measured luminance distribution to the other regions symmetrically in the horizontal direction as well as in the vertical direction against the two lines 22, 24 perpendicular to each other respectively.

The measured luminance distribution for the region 26 was shown in FIG. 3A and in FIG. 3B. FIG. 3A and FIG. 3B show tables each showing distribution of luminance (cd/m²)

at each point (x, y) from the origin to the coordinate point 12 in the X-axial direction and from the origin to the coordinate point 25 in the Y-axial direction. The tables show that the luminance is lowest at the coordinate point (0, 0) and becomes higher in the coordinate area close to the LED. Non-uniformity in luminance in this case is 4.4 times when expressed by the maximum/minimum ratio on the plane.

FIG. 4 shows the luminance distribution on the entire light-emitting surface based on the tables of the measured luminance distribution for the region 26 with contour lines 28. From the contour lines indicating the luminance distribution, it can be understood that the emitted light from the LED extends in the radial form and the extension angle $2\theta$ is about 60 degrees.

FIG. 5A and FIG. 5B show tables each showing the standardized luminance distribution obtained by standardizing the distribution of measured luminance through inverse-proportional conversion using the minimum value in the distribution of luminance shown in FIG. 3A and FIG. 3B as a reference. The minimum value in the distribution of luminance shown in FIG. 3A and FIG. 3B is 98.76 cd/cm$^2$ at the coordinate point (0, 0), and luminance values at other coordinate points are standardized through inverse-proportional conversion. Namely a standardized value at each coordinate point is calculated (standardized) through the following equation:

Standardized value=$A\times98.76$/measured luminance wherein A indicates a proportional constant. The obtained standardized value is in inverse proportion to the luminance, and as the luminance is higher, the standardized value is lower. The standardized values shown in FIG. 5A and FIG. 5B are those when A is equal to 1.

The method of allocating a circular dot of a light scatterer to each coordinate point is described below. FIG. 6A and FIG. 6B are tables each showing the radiuses of circular dots per unit area (mm$^2$) calculated from the standardized values shown in FIG. 5A and FIG. 5B through the equation of standardized value=$A\times\pi\times(\text{radius})^2$ assuming that A is equal to 1 (A=1). Each numerical value in these tables indicates the diameter of a circular dot at each coordinate point, and a plate for a print pattern is prepared assuming that the diameter of a circular dot is that of a printed circular dot in a square segment with the area of 1 mm$^2$.

Figure 7:
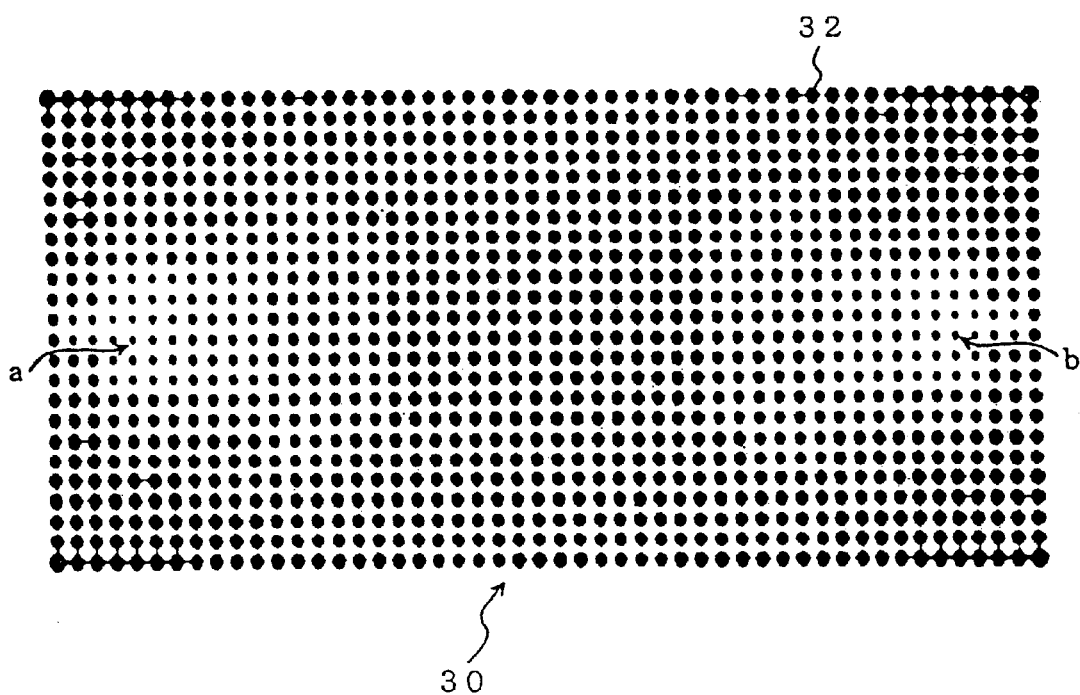
FIG. 7 is a view showing a printed circular dot pattern.

A pattern of circular dots is printed on a bottom surface of the light guiding member using the prepared plate for the print pattern. FIG. 7 shows one example of a printed circular dot pattern 30. A solid circle 32 in this figure shows a circular dot, and the reflectivity in the circular dot section is high. The light scatterer pattern formed with a pattern of the circular dots as described above has the feature that the reflectivity is minimum at the sections "a" and "b" on the surface.

A plane display lamp is assembled using the light guiding member 12 with the circular dot pattern 30 printed on the bottom surface thereof. Namely the white bottom plate 16 is adhered to a bottom of the light guiding member 12, the white casing frame 18 is set therein, and the diffusing sheet 20 is adhered to the light-emitting surface. In the plane display lamp as described above, the LEDs 14a and 14b are turned ON, and the luminance distribution is measured. The measured values are shown in FIG. 8. At the coordinate point (22, 10), the maximum luminance was 118.9 cd/m$^2$, while the minimum luminance at the coordinate point (4, 12) was 60 cd/m$^2$, and non-uniformity in luminance in terms of maximum/minimum ratio is 1.98 times, which indicates that the non-uniformity is suppressed to a level lower than 2 times.

To obtain more uniform luminance distribution, the method is also effective in which the luminance is once corrected by the pattern designing method described above, further the luminance distribution is measured in the same way, distribution of standardized values is obtained, and the luminance distribution obtained first is subjected to secondary correction. By repeating correction a required number of times (n), homogenous and high luminance can be obtained on the light-emitting surface of the light guiding member.

An example of a single color light source in which one LED chip is packaged in one dot-like light source has been described above, and in the case where a plurality of LED chips are provided in on LED package, regardless of which of the plurality of LED chips emits light, as a geometrical and positional relation between the light guiding member and the LED chip is kept substantially constant, so that the light emitted from the LED chip is homogeneously distributed from the light-emitting surface of the light guiding member. Namely a light-emitting surface with the generally homogeneous luminance distribution is obtained. For instance, LED chips for emitting lights with red (R), green (G), and blue (B) colors are packaged in the same LED package so that a distance between the two adjoining chips is about 1 mm, and the package is used as a light source. This display lamp can be turned ON switching between the R, G and B colors, and further LED chips for two or three colors can simultaneously be turned ON to emit light with a mixed color. As the distance between LED chips is small as described above, change of non-uniformity in the luminance at each light-emitting point for the same dot pattern can visually be recognized little. The plurality of LED chips described above may emit light having the same color. In this case, the displays in which the luminance level may be changed is implemented.

In the embodiment described above, a longer edge of the rectangular flat light guiding member is 50 mm, but the length is allowable in the range from about 20 to about 200 mm. The luminance largely depends on intensity of light emitted from an LED, and when the light has the intensity similar to that described in the example described above, the luminance of the displays becomes lower as the size becomes larger. Further it is necessary to redesign the dot pattern each time the size of the light guiding member is changed.

Further in the embodiment described above, the light scatter was formed with circular dots, but a form of the dot is not limited to a circular one. Rather a square pattern which has the same form as the square segment is better because higher consistency between the luminance and the area ratio can be realized. Further a form of light scatterer pattern may be changed to many other ones including a rhombic one.

Further, the screen printing method was used as a method of forming a light scatterer in the embodiment described above, but it is possible to form a light scatterer pattern by applying various types of organic or inorganic light scattering materials (mainly white paint) onto a bottom surface of a light guiding member by such a method as the offset printing or ink-jet printing.

Instead of applying a highly reflective material as described above, the light may be reflected by roughing a bottom surface of the light guiding member. The methods which can be used make rougher bottom surface of a light guiding member include mechanically roughing the bottom surface, forming a number of fine irregularities, for instance, by the sandblast method, directly performing processing for generation of irregularities to a metal mold for injection molding and transferring the irregularities to a bottom surface of the light guiding member of SC machining. Basically these methods are based on utilization of the light scattering and reflection effect provided by roughing the bottom surface.

Second Embodiment

FIG. 9 shows a plane display lamp according to a second embodiment of the present invention. This display lamp 22 has the configuration in which, in the structure shown in FIG. 1, a letter or a sign 34 is printed on the diffusing sheet 20, or a light shielding plate 36 made from a metal or plastics is adhered on the diffusing sheet 20. Also the configuration is allowable in which an opaque letter or a sign is printed or adhered on a glass or transparent glass or plastic sheet. With the configurations as described above, it is possible to obtain a plane display lamp capable of displaying a letter or a sign.

Third Embodiment

In the first and second embodiments of the present invention, two dot-like light sources, namely two LEDs are provided at a central position of each of the side faces in the side of the shorter edges of the light guiding member opposing to each other respectively. However, realizing a plane display lamp insuring high uniformity in luminance only with one dot-like light source provides a number of advantages including cost reduction, easiness of the manufacture, reduced power consumption, and the like.

In the first embodiment, when the LED 14b is removed, the luminance distribution on the light-emitting surface corresponding to that shown in FIG. 3 is as shown in FIG. 10. In FIG. 10, the regions separated from each other with contour lines 38 are indicated by the signs 38-1, 38-2, 38-3, 38-4, 38-5, and 38-6. As only one piece of LED is provided, light from the LED does not fully reach corners of the light-emitting surface in the side of the LED 14, so that the luminance in the region 38-6 is insufficient. This phenomenon occurs because intensity of the light emitted from the LED is higher at positions closer to the center of the light-emitting section as well as to the normal line thereto and lower at positions farther from the center (in the direction at 90 degrees against the normal line and does not directly reach corners of the light guiding member in the LED side. The luminance in the highest luminance region was 7 times or more higher as compared to that in the lowest luminance region where the light from the LED does not fully reach.

In the plane display lamp with only one LED provided therein, a dot pattern is printed on a bottom surface of the light guiding member by the circular dot pattern formation method similar to that employed in the first embodiment. In this case, even when white paint is applied to the entire bottom surface of the light guiding member in the insufficient luminance region 38-6 and at the same time 0.09 mm$^2$ dot is provided per 1 mm$^2$ (area ratio is 11) in the highest luminance region 18-1, the luminance in the highest luminance region 28-1 is 2 times or more higher as compared to that in the insufficient luminance region 28-6, so that it is difficult to obtain a light-emitting surface insuring uniform light emission.

To solve the problem described above, the present inventors investigates the possibility of development of a means capable of reducing non-uniformity in the luminance on a light-emitting surface of a light guiding member even in a plane display lamp with only one LED provided therein. At first, the state of light in a light guiding member is discussed in detail below. The light coming into a light scatterer pattern printed on a bottom surface of the light guiding member is scattered by this light scatterer pattern in the light guiding member. On the other hand, the light introduced to a region where a light scatterer pattern is not present follows the Snell's law, and is totally reflected on a surface of the light guiding member, or is emitted to a space outside the light guiding member. Namely assuming that an angle between a normal to a surface of a light guiding member and a light beam inside the light guiding member is $\psi$ and a refraction index of the light guiding member is n, the light beam follows the Snell's law, and is totally reflected on a surface of the light guiding member when $n \cdot \sin\psi$ is larger than 1. So long as this condition is satisfied, the light beam is repeatedly reflected inside the light guiding member, and does not go out of the light guiding member. When $n \cdot \sin\psi$ is smaller than 1, the light beam is emitted from the light guiding member. In the case of a plane display lamp, as each face excluding the light-emitting surface is covered with a white casing, the light emitted from the light guiding member is partially reflected by the white casing and goes back into the light guiding member.

As described above, behaviors of light in a light guiding member including a casing are very complicated, but a percentage of the light scattered by the light scatterer and emitted therefrom is substantially high. Therefore, it has been found that, by appropriately selecting a section where the light scatterer is to be formed, it is possible to provide uniform luminance distribution on a light-emitting surface.

Based on this recognition, the inventors have provided a light scatterer on each side face of a rectangular light guiding member. It can be expected that, by providing a light scatterer on a side face of the light guiding member close to the insufficient luminance region 38-6, the light otherwise emitted from the side face to the outside can effectively be utilized. When actually a printed pattern is provided on all over the necessary side face, the luminance in the insufficient luminance region remarkably increased.

Printing light scatterer patterns on both a bottom surface and side faces of a light guiding member required a very complicated manufacturing process. So the present inventors have devised the method in which a printed pattern is formed only on a bottom surface of a light guiding member and is not required to be formed on side faces thereon.

This method is described below with reference to the third embodiment. FIG. 11 and FIGS. 12A, 12B, 12C and 12D shows a light guiding member 40 according to this embodiment. FIGS. 12A, 12B, 12C and 12D are views showing a top surface and side surfaces of the light guiding member 40 according to this embodiment.

The light guiding member 40 has a plate-like form as shown in FIG. 11, and comprises a bottom surface 44 opposite to the top surface, and side faces 50, 52, 54, and 56. The three side faces 50, 52, 54 excluding the side face 56 are inclined. Namely the side faces are inclined so that the distance between two opposing side faces becomes larger as it goes farther from the top surface 42 and closer to the bottom surface 44. The inclination of each of the three side face in this embodiment is, for instance, 45 degrees.

Provided on the inclined side face 50 is a recessed section 58 extending from a top surface of the light guiding member 40 to a bottom surface thereof at a center of the inclined side face. The recessed section 58 should preferably have a form allowing installation of the LED 14 so that the light emitted from the LED 14 and advancing straight over the shortest distance will be introduced onto the opposite side face 56 at substantially right angles.

As described above, when there is provided only one LED, there is the region 38-6 where the luminance 38-6 is insufficient (Refer to FIGS. 12A, 12B, 12C and 12D). To overcome the problem, highly reflective ink is printed over the entire bottom surface of the light guiding member 40 with one LED provided therein as shown in FIG. 11 is prepared, and a plane display lamp for designing a light scattering pattern is assembled using this light guiding member to design a circular dot pattern. The circular dot pattern designed as described above is printed on a bottom surface of the light guiding member just below a top surface thereof. In addition, a pattern 62 is printed all over in part on bottom surfaces just below the inclined side faces 50, 52, 54 and close to the insufficient luminance region 38-6 respectively. With the printed patterns 62, the luminance in the insufficient luminance region 38-6 is increases to a level equal to or higher than that in the region 38-5, and the plane display lamp insures uniformity in the luminance with the light from one LED 12.

As a variant of the light guiding member as described above, the following one is conceivable. In the light guiding member 40 shown in FIG. 11, the same effect can be achieved, for instance, by printing a pattern on the entire not-inclined side face 56. Further it is also possible to transfer a light-scattering pattern by means of a metal mold onto side faces of the light guiding member in place of printing the pattern on each side face thereof.

Further it is also possible to deform a light guiding member, for instance, by inclining only a side face on which an LED is mounted, or by also inclining a side face with no LED mounted thereon and opposite to the side face with an LED mounted thereon. In addition, a side face of the light guiding member may be inclined not over the full length from the top surface to the bottom surface, but for instance from the top surface to the middle of each side face.

Fourth Embodiment

Next a fourth embodiment of the present invention is described with reference to FIG. 13. This embodiment is a variant of the embodiment described with reference to FIG. 11 and FIGS. 12A, 12B, 12C and 12D, and in this embodiment, the LED 14 is provided on a bottom surface of the light guiding member just below the inclined side face of the light guiding member 40. The light emitted from the LED 14 advances goes into the light guiding member from its bottom surface and is reflected and scattered by the inclined side face 50 or a casing (not shown) and is led to inside of the light guiding member 40.

Further to raise the efficiency in reflection and scattering, a recessed section 70 having a curved surface for reflecting or scattering light is provided on the inclined surface 50 just above the LED. The luminance distribution on the light-emitting surface of the plane display lamp could be uniformed by making a form of the surface of this recessed section 70 aspheric.

Fifth Embodiment

A fifth embodiment of the present invention is described with reference to FIG. 15. This embodiment is a variant of the embodiment of the present invention shown in FIG. 11, and in this embodiment, a hole for engagement is provided inside the light guiding member 40 adjacent to the inclined side face 50, and a dome-shaped resin-shielded type of LED 72 is provided in the hole 40. The light emitted from the resin-shielded type of LED 72 is reflected and scattered by the inclined side face 50 or a casing (not shown) and is led to inside of the light guiding member 40.

Inclining one or a plurality of side faces of a light guiding member like in the third to fifth embodiments provides advantages also in the manufacture of a light guiding member. A light guiding member is generally manufactured by molding a transparent resin such as acrylic resin into a desired form with a metal mold. When one or a plurality of side faces of the metal model are inclined, the light guiding member may easily be released from the metal mold without damaging the side faces of the light guiding member.

In the third to fifth embodiments of the present invention, only the light guiding member is shown, and a casing covering the light guiding member is not shown. This casing functions also to reflect light emitted from the light guiding member, so that the color is typically white like in the first embodiment, but the color may be other one like, for instance, silver. In the case of a single color light source, an appropriate color can be selected according to the wavelength of the light emitted from the light source.

Industrial Applicability

With the present invention, as an LED, which is a semiconductor chip, is used as a light source, a high voltage circular as a drive circular is not necessary, and also a plane display lamp with long lifetime and high reliability can be realized. Further as one or two compact size LEDs may be used therein, a small size, light weight, and compact plane display lamp with low power consumption can be obtained. When two LEDs are used in the plane display lamp as described above, a light guiding member with a light scattering dot pattern formed thereon by the pattern formation method according to the present invention is used, so that the uniform luminance distribution can be obtained. Further when a light guiding member with inclined side face(s) is used, alight scattering pattern is provided on the side faces adjacent to the insufficient luminance region or on a bottom surface of the light guiding member just below the side faces, so that the uniform luminance distribution can be obtained.

What is claimed is:

1. A method of forming a light scatterer dot pattern on a bottom surface of a plate-like light guiding member in a planar display lamp including said light guiding member; and bottom plate covering a bottom surface of said light guiding member; a casing frame covering side faces of said light guiding member; a diffusing sheet covering a top surface of said light guiding member; and dot-like light sources provided on one side face or on two side faces opposite to each other of said light guiding member and emitting light to said light guiding member; said method comprising the steps of:

a) forming a light scatterer homogeneously all over a bottom surface of a trial light guiding member, the trial light guiding member having a size and composition that is substantially equivalent to said light guiding member;

b) assembling a trial planar display lamp using said trial light guiding member prepared in step a;

c) measuring a luminance value at each coordinate point on a light-emitting surface of said trial planar display lamp;

d) converting the measure luminance value at each coordinate point to standardized value by applying an inverse-proportional operation to the measured luminance value, using a lowest value in a distribution of the measured luminance values as a reference value;

e) calculating an area of a light scatterer dot at each coordinate point from the standardized value obtained from the conversion in step d; and f) forming a pattern of light scatterer dots each area thereof is calculated in step e on a bottom surface of a light guiding member different from said trial light guiding member.

2. The method according to claim 1 further comprising the steps of:

g) assembling a second trial planar display lamp using the trial light guiding member prepared in step f;

h) measuring a further luminance value at each coordinate point on a light-emitting surface of the second trial planar display lamp;

i) converting the further measured luminance value at each coordinate point to standardized value by applying an inverse-proportional operation to the further measured luminance value, using a lowest value in a distribution of the further measured luminance values as a reference value;

j) calculating an area of a light scatterer dot at each coordinate point from the standardized value obtained from the conversion in step i;

k) forming a pattern of light scatterer dots each area thereof is calculated in step j on a bottom surface of a light guiding member different from the light guiding member prepared in step f; and l) repeating the operating sequence from step g to step k n times (n being an integer larger than 0) to the light guiding member prepared in step k.

3. The method according to claim 1, wherein the conversion to the standardized value in step d is performed using the following equation:

Standardized value=Lowest luminance value/measured luminance at each coordinate point.

4. The method according to claim 2, wherein conversion to the standardized value in the steps d and i is performed through the following equation:

Standardized value=Lowest luminance value/measured luminance at each coordinate point.

5. The method according to claim 3 or 4, wherein said light scatterer dot has a form satisfying the following condition:

Standardized value=$A \times$dot area wherein A indicates a proportional constant.

6. The method according to claim 3 or 4, wherein, when said light scatterer dot is a circular dot, the radius thereof is calculated through the following equation:

Standardized value=$A \times \pi \times (\text{radius})^2$ wherein A indicates a proportional constant.

7. The method according to any of claim 1 or 2, wherein said light scatterer dot pattern is formed so that a reflection factor is minimum at a position adjacent to each of said dot-like light sources.

8. A planar display lamp comprising:

a plate-like light guiding member, a bottom surface thereof having a light scattering means;

a bottom plate covering a bottom surface of said light guiding member;

a casing frame covering side faces of said light guiding member;

a diffusing sheet covering a top surface of said light guiding member; and dot-like light sources provided on one side face or on two side faces opposite to each other of said light guiding member and emitting light to said light guiding member;

wherein said light scatterings a light scatterer dot pattern formed by the method according to claim 1 or 2 on a bottom surface of said light guiding member just below a top surface thereof.

9. A planar display lamp comprising:

a plate-like light guiding member having a rectangular top surface, a rectangular bottom surface, and four side faces each vertical to said top surface as well as to said bottom surface, a bottom surface of said light guiding member having a light scattering means;

a bottom plate covering a bottom surface of said light guiding member;

a casing frame covering side faces of said light guiding member;

a diffusing sheet covering a top surface of said light guiding member; and dot-like light sources provided on one side face or on two side faces opposite to each other of said light guiding member and emitting light to said light guiding member;

wherein said light scattering means is a light scatterer dot pattern formed by the method according to claim 1 or 2 on a bottom surface of said light guiding member just below a top surface thereof.

10. A planar display lamp comprising:

a plate-like light guiding member having a rectangular top surface, a rectangular bottom surface, and four side faces, at least one of which has an inclination extending from said top surface toward said bottom surface, a bottom surface of said light guiding member having a light scattering means;

a bottom plate cove ring a bottom surface of said light guiding member;

a casing frame covering four side faces of said light guiding member;

a diffusing sheet covering a top surface of said light guiding member; and one dot-like light source emitting light to said light guiding member;

wherein said light scattering means is a light scatterer dot pattern formed by the method according to claim 1 or 2 on a bottom surface of said light guiding member just below a top surface thereof.

11. The planar display lamp according to claim 8:

wherein said light scatterer dot pattern is formed so that a reflection factor is minimum at a position adjacent to each of said dot-like light sources.

12. The planar display lamp according to claim 9:

wherein said light scatterer dot pattern is formed so that a reflection factor is minimum at a position adjacent to each of said dot-like light sources.

13. The planar display lamp according to claim 10:

wherein said light scatterer dot pattern is formed so that a reflection factor is minimum at a position adjacent to each of said dot-like light sources.

* * * * *

UNITED STATES PATENT AND TRADEMARK OFFICE
CERTIFICATE OF CORRECTION

PATENT NO. : 6,502,946 B1 Page 1 of 1
DATED : January 7, 2003
INVENTOR(S) : Kouzou Fujino et al.

It is certified that error appears in the above-identified patent and that said Letters Patent is hereby corrected as shown below:

<u>Column 1,</u>
Line 31, "color is provided under a semitransparent plastic plate, but" should read
-- color is provided under a semi-transparent plastic plate, but --.

<u>Column 12,</u>
Line 39, "a bottom plate cove ring a bottom surface of said light" should read
-- a bottom plate covering a bottom surface of said light --.

Signed and Sealed this

Twenty-first Day of October, 2003

JAMES E. ROGAN
*Director of the United States Patent and Trademark Office*